(12) United States Patent
Kahng et al.

(10) Patent No.: US 11,719,631 B2
(45) Date of Patent: Aug. 8, 2023

(54) MEASURING LIGHT SCATTERING OF A SAMPLE

(71) Applicant: Wyatt Technology Corporation, Goleta, CA (US)

(72) Inventors: Dwight Kahng, Camarillo, CA (US); Cha Lee, Santa Barbara, CA (US); Sigrid C. Kuebler, Old Orchard Beach, ME (US); Ross E. Bryant, Cape Elizabeth, ME (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 126 days.

(21) Appl. No.: 17/477,528

(22) Filed: Sep. 16, 2021

(65) Prior Publication Data
US 2022/0147234 A1    May 12, 2022

Related U.S. Application Data

(60) Provisional application No. 63/079,475, filed on Sep. 16, 2020.

(51) Int. Cl.
*G01N 21/47*   (2006.01)
*G06F 3/04847*   (2022.01)

(52) U.S. Cl.
CPC ......... *G01N 21/47* (2013.01); *G06F 3/04847* (2013.01); *G01N 2201/126* (2013.01)

(58) Field of Classification Search
CPC ............... G06F 3/04847; G01N 21/47; G01N 2201/126; G01N 2021/4711; G01N 21/51
See application file for complete search history.

(56) References Cited

U.S. PATENT DOCUMENTS

2020/0026397 A1\* 1/2020 Wohlstadter ........... G16C 20/10
2020/0150137 A1\* 5/2020 Day .................... G01N 15/0211

\* cited by examiner

*Primary Examiner* — David P Porta
*Assistant Examiner* — Gisselle M Gutierrez
(74) *Attorney, Agent, or Firm* — Leonard T. Guzman

(57) ABSTRACT

The present disclosure describes a computer implemented method, a system, and a computer program product of measuring light scattering of a sample.

21 Claims, 22 Drawing Sheets

FIG. 6

MEASURING LIGHT SCATTERING OF A SAMPLE

PRIORITY

This application claims priority to U.S. Provisional Patent Application No. 63/079,475, filed Sep. 16, 2020.

BACKGROUND

The present disclosure relates to multi-angle light scattering, and more specifically, to measuring light scattering of a sample.

SUMMARY

The present disclosure describes a computer implemented method, a system, and a computer program product of measuring light scattering of a sample. In an exemplary embodiment, the computer implemented method, the system, and the computer program product include (1) displaying, by a computer system, at least one graphic, where the at least one graphic is one of an alarms graphic, a size graphic, a molar mass graphic, a presets graphic, an experiments graphic, and a settings graphic, on a display logically coupled to a light scattering measurement instrument, thereby resulting in a graphics page, where the instrument is configured to measure at least one of dynamic light scattering, static light scattering, and electrophoretic light scattering, of at least one sample, resulting in a light scattering measurement, (2) in response to receiving, by the computer system, a selection command corresponding to the alarms graphic, displaying, by the computer system, on the display an alarms page, (3) in response to receiving, by the computer system, a selection command corresponding to the size graphic, displaying, by the computer system, on the display a size workflow page displaying a guided size workflow, where the guided size workflow includes size functions corresponding to size parameter commands to direct the instrument to take at least one size measurement in light of entered size parameter commands corresponding to the size functions, (4) in response to receiving, by the computer system, a selection command corresponding to the molar mass graphic, displaying, by the computer system, on the display a molar mass workflow page displaying a guided molar mass workflow, where the guided molar mass workflow includes molar mass functions to direct the instrument to take at least one molar mass measurement in light of entered molar mass parameter commands corresponding to the molar mass parameter commands, (5) in response to receiving, by the computer system, a selection command corresponding to the presets graphic, displaying, by the computer system, on the display a presets page configured to provide access to at least one saved workflow, (6) in response to receiving, by the computer system, a selection command corresponding to the experiments graphic, displaying, by the computer system, on the display an experiments page configured to display results obtained during at least one saved experiment and configured to provide access to the results, and (7) in response to receiving, by the computer system, a selection command corresponding to the settings graphic, displaying, by the computer system, on the display a settings page configured to display instrument settings and configured to allow for modifying at least one setting of the instrument.

BRIEF DESCRIPTION OF THE DRAWINGS

FIG. 6 depicts a graphical display in accordance with an embodiment.

DETAILED DESCRIPTION

Figure 1A:
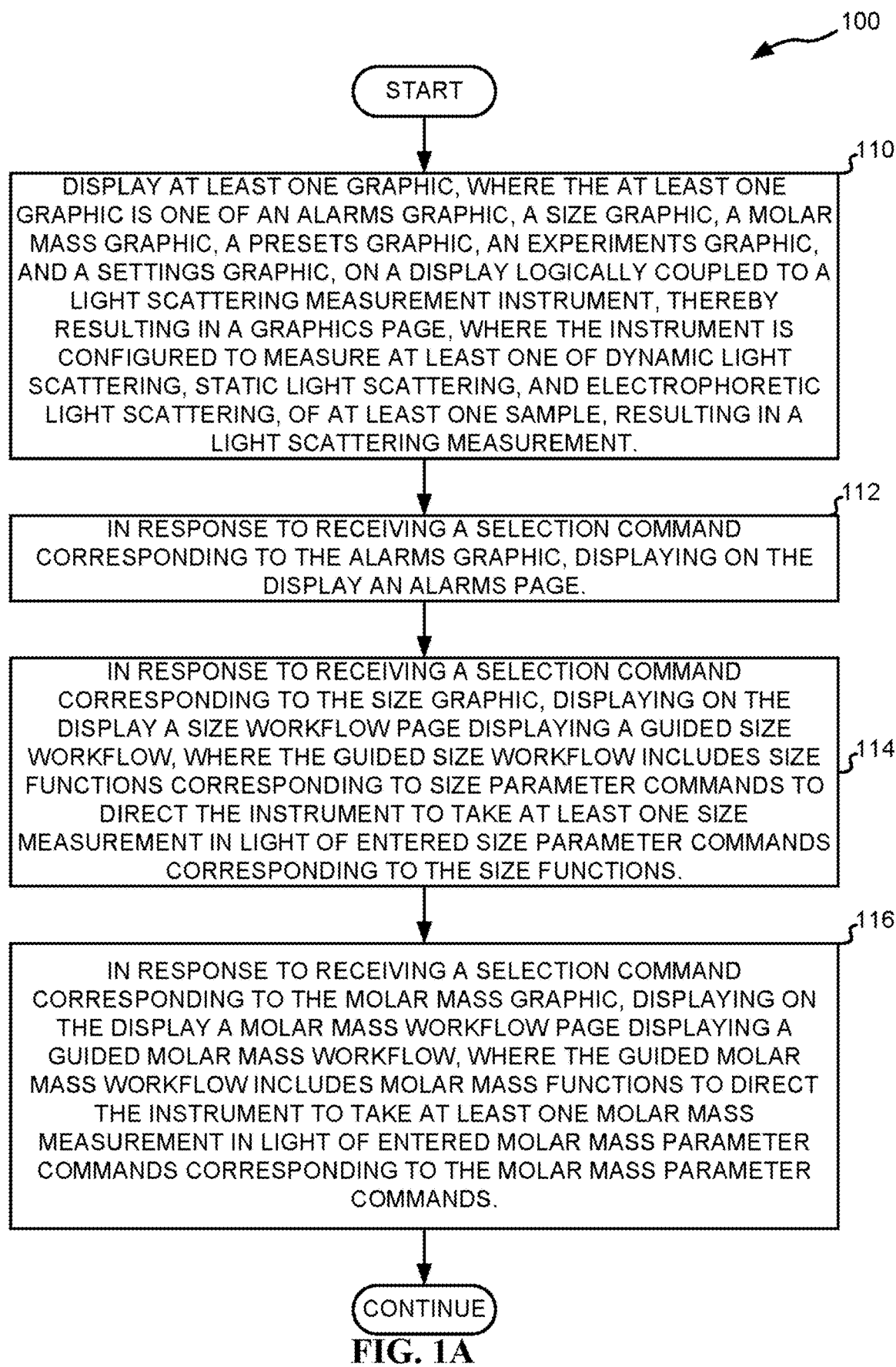
FIG. 1A depicts a flowchart in accordance with an exemplary embodiment.

The present disclosure describes a computer implemented method, a system, and a computer program product of measuring light scattering of a sample. In an exemplary embodiment, the computer implemented method, the system, and the computer program product include (1) displaying, by a computer system, at least one graphic, where the at least one graphic is one of an alarms graphic, a size graphic, a molar mass graphic, a presets graphic, an experiments graphic, and a settings graphic, on a display logically coupled to a light scattering measurement instrument, thereby resulting in a graphics page, where the instrument is configured to measure at least one of dynamic light scattering, static light scattering, and electrophoretic light scattering, of at least one sample, resulting in a light scattering measurement, (2) in response to receiving, by the computer system, a selection command corresponding to the alarms graphic, displaying, by the computer system, on the display an alarms page, (3) in response to receiving, by the computer system, a selection command corresponding to the size graphic, displaying, by the computer system, on the display a size workflow page displaying a guided size workflow, where the guided size workflow includes size functions corresponding to size parameter commands to direct the instrument to take at least one size measurement in light of entered size parameter commands corresponding to the size functions, (4) in response to receiving, by the computer system, a selection command corresponding to the molar mass graphic, displaying, by the computer system, on the display a molar mass workflow page displaying a guided molar mass workflow, where the guided molar mass workflow includes molar mass functions to direct the instrument to take at least one molar mass measurement in light of entered molar mass parameter commands corresponding to the molar mass parameter commands, (5) in response to receiving, by the computer system, a selection command corresponding to the presets graphic, displaying, by the computer system, on the display a presets page configured to provide access to at least one saved workflow, (6) in response to receiving, by the computer system, a selection command corresponding to the experiments graphic, displaying, by the computer system, on the display an experiments page configured to display results obtained during at least one saved experiment and configured to provide access to the results, and (7) in response to receiving, by the computer system, a selection command corresponding to the settings graphic, displaying, by the computer system, on the display a settings page configured to display instrument settings and configured to allow for modifying at least one setting of the instrument. In an embodiment, the selection command corresponds to at least one of a computer mouse click, hovering over a graphic, text, sound, and eye gaze.

In an embodiment, the displaying the guided size workflow results in displaying a summary page corresponding to the at least one size measurement. In an embodiment, the size functions include a cuvette function, a solvent function, a temperature function, a measurements function, and a summary function. In an embodiment, the size parameter commands include a cuvette command, a solvent command, a temperature command, and a measurements command.

In an embodiment, the displaying the guided molar mass workflow results in displaying a summary page corresponding to the at least one molar mass measurement. In an embodiment, the molar mass functions include a cuvette function, a sample function, a solvent function, a temperature function, a measurements function, and a summary function. In an embodiment, the molar mass parameter commands comprise a cuvette command, sample command, a solvent command, a temperature command, and a measurements command.

In an embodiment, the results may be accessed by at least one of downloading the results, streaming the results, emailing the results, and printing the results. In an embodiment, the results obtained during the at least one saved experiment include a workflow and data corresponding to the at least one saved experiment. In an embodiment, the instrument settings include at least one of present instrument settings and past instrument settings.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

There is a need to measure light scattering of a sample.

Figure 1B:
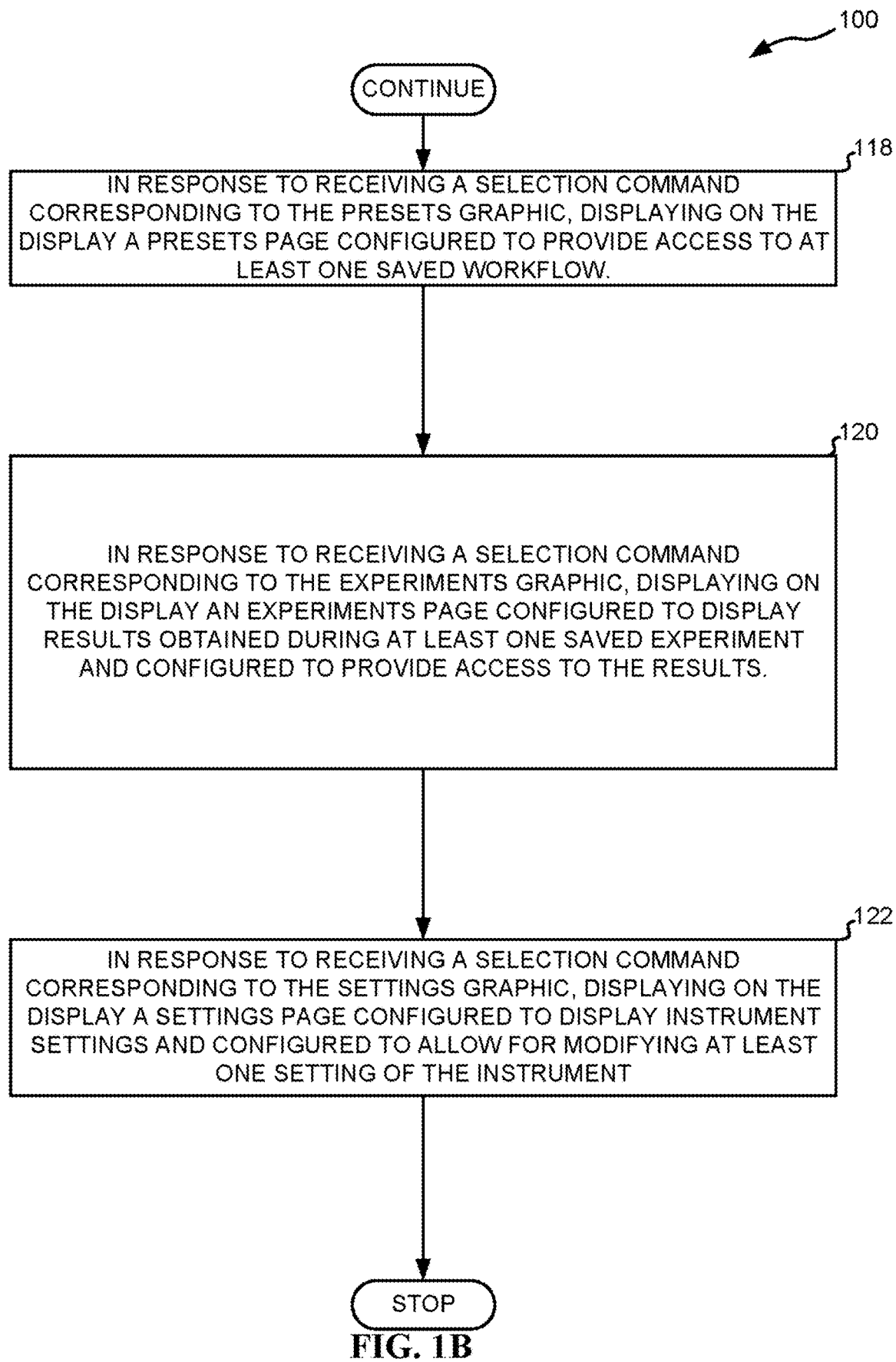
FIG. 1B depicts a flowchart in accordance with an exemplary embodiment.
Figure 1C:
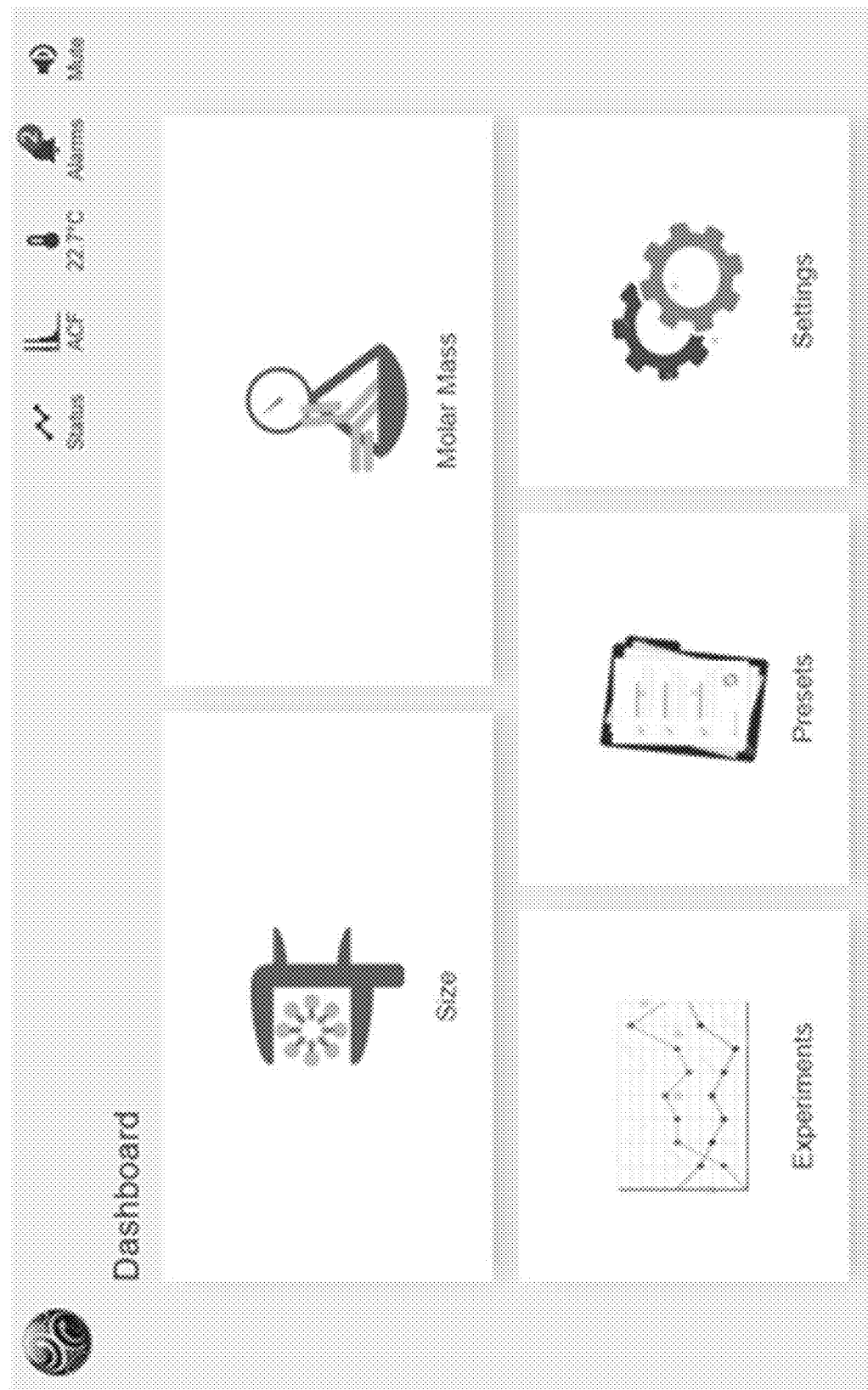
FIG. 1C depicts a graphical display in accordance with an embodiment.

Referring to FIG. 1A, FIG. 1B, and FIG. 1C, in an exemplary embodiment, the computer implemented method, the system, and the computer program product are configured to perform an operation 110 of displaying, by a computer system, at least one graphic, where the at least one graphic is one of an alarms graphic, a size graphic, a molar mass graphic, a presets graphic, an experiments graphic, and a settings graphic, on a display logically coupled to a light scattering measurement instrument, thereby resulting in a graphics page, where the instrument is configured to measure at least one of dynamic light scattering, static light scattering, and electrophoretic light scattering, of at least one sample, resulting in a light scattering measurement, an operation 112 of in response to receiving, by the computer system, a selection command corresponding to the alarms graphic, displaying, by the computer system, on the display an alarms page, an operation 114 of in response to receiving, by the computer system, a selection command corresponding to the size graphic, displaying, by the computer system, on the display a size workflow page displaying a guided size workflow, where the guided size workflow includes size functions corresponding to size parameter commands to direct the instrument to take at least one size measurement in light of entered size parameter commands corresponding to the size functions, an operation 116 of in response to receiving, by the computer system, a selection command corresponding to the molar mass graphic, displaying, by the computer system, on the display a molar mass workflow page displaying a guided molar mass workflow, where the guided molar mass workflow includes molar mass functions to direct the instrument to take at least one molar mass measurement in light of entered molar mass parameter commands corresponding to the molar mass parameter commands, an operation 118 of in response to receiving, by the computer system, a selection command corresponding to the presets graphic, displaying, by the computer system, on the display a presets page configured to provide access to at least one saved workflow, an operation 120 of in response to receiving, by the computer system, a selection command corresponding to the experiments graphic, displaying, by the computer system, on the display an experiments page configured to display results obtained during at least one saved experiment and configured to provide access to the results, and an operation 122 of in response to receiving, by the computer system, a selection command corresponding to the settings graphic, displaying, by the computer system, on the display a settings page configured to display instrument settings and configured to allow for modifying at least one setting of the instrument.

Figure 10:
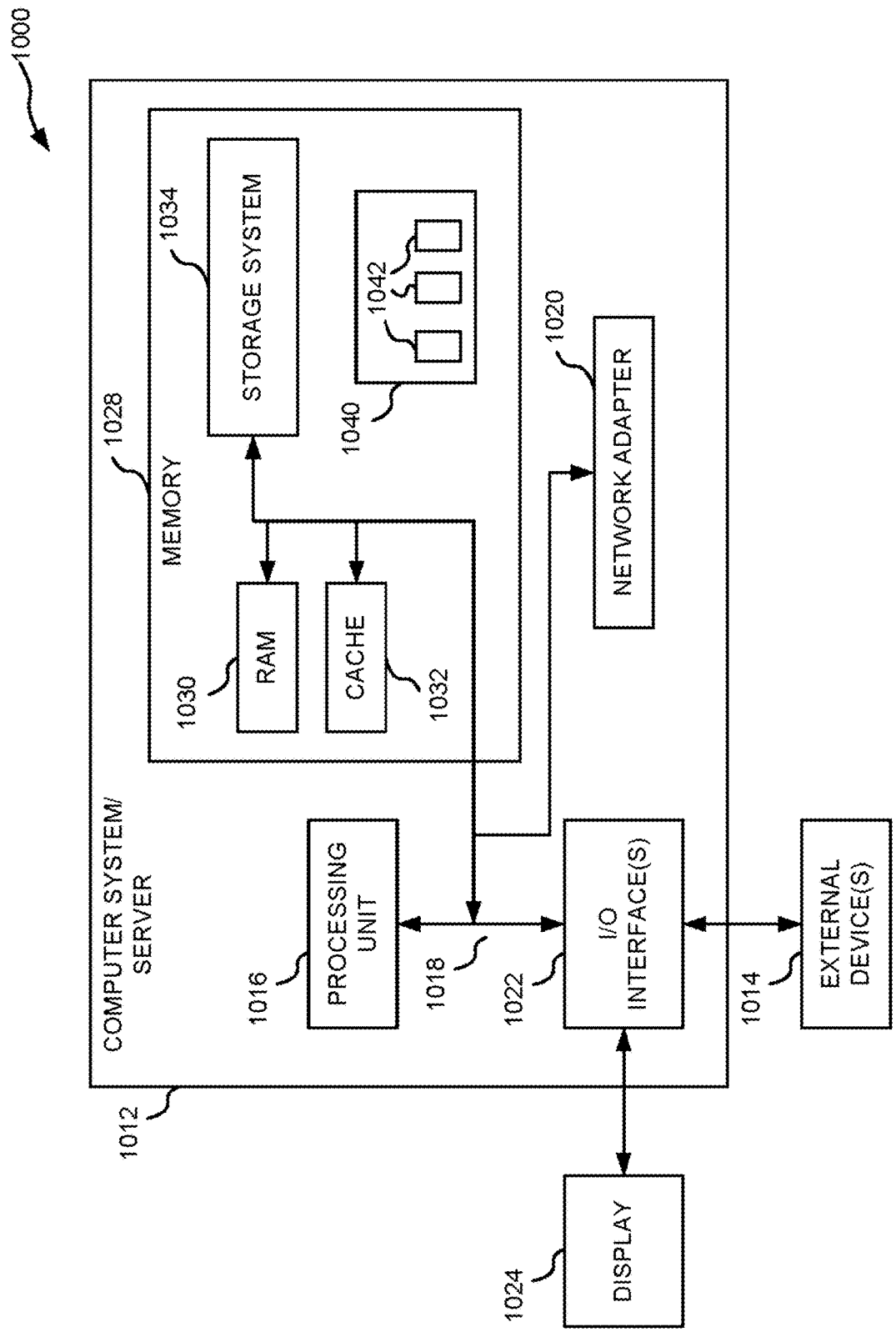
FIG. 10 depicts a computer system in accordance with an exemplary embodiment of the present invention.

In an exemplary embodiment, the computer system is a standalone computer system, such as computer system 1000 shown in FIG. 10, a network of distributed computers, where at least some of the computers are computer systems such as computer system 1000 shown in FIG. 10, or a cloud computing node server, such as computer system 1000 shown in FIG. 10. In an embodiment, the computer system is a computer system 1000 as shown in FIG. 10, that executes a measuring light scattering of a sample script or computer software application that carries out the operations of at least method 100. In an embodiment, the computer system is a computer system/server 1012 as shown in FIG. 10, that executes a measuring light scattering of a sample script or computer software application that carries out the operations of at least method 100. In an embodiment, the computer system is a processing unit 1016 as shown in FIG. 10, that executes a measuring light scattering of a sample script or computer software application that carries out the operations of at least method 100. In an embodiment, the computer system is a processor of the analytical instrument, that executes a measuring light scattering of a sample script or computer software application that carries out the operations of at least method 100.

In an embodiment, the computer system is a computer system 1000 as shown in FIG. 10, that executes a measuring light scattering of a sample script or computer software application that carries out at least operations 110, 112, 114, 116, 118, 120, and 122. In an embodiment, the computer system is a computer system/server 1012 as shown in FIG. 10, that executes a measuring light scattering of a sample script or computer software application that carries out at least operations 110, 112, 114, 116, 118, 120, and 122. In an embodiment, the computer system is a processing unit 1016 as shown in FIG. 10, that executes a measuring light scattering of a sample script or computer software application that carries out at least operations 110, 112, 114, 116, 118, 120, and 122.

In an embodiment, the computer system is a machine learning computer software/program/algorithm that executes a a measuring light scattering of a sample script or computer software application that carries out the operations of at least method 100. In an embodiment, the computer system is a machine learning computer software/program/algorithm that executes a measuring light scattering of a sample script or computer software application that carries out at least operations 110, 112, 114, 116, 118, 120, and 122.

Alarms

Figure 2:
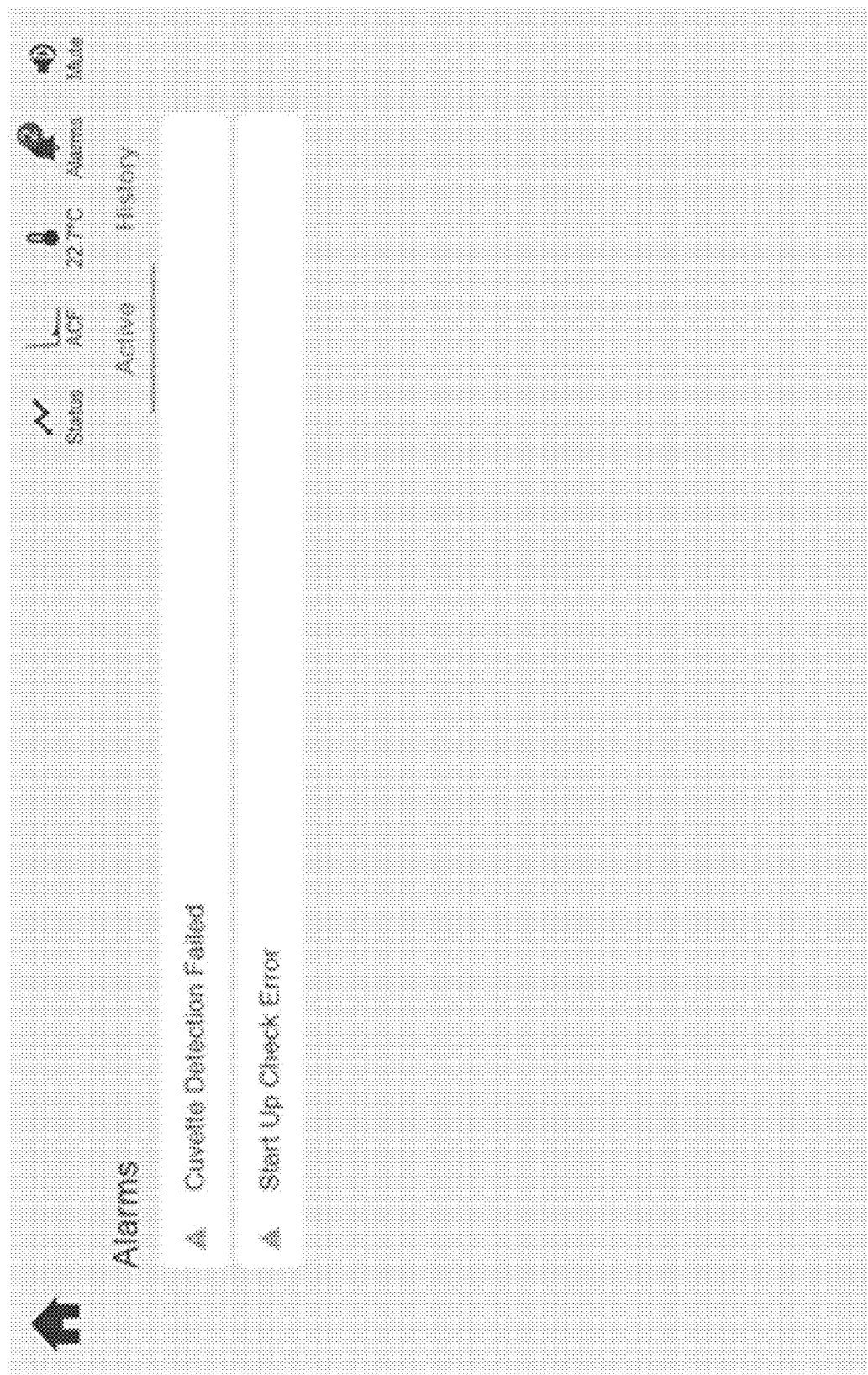
FIG. 2 depicts a graphical display in accordance with an embodiment.
Figure 3A:
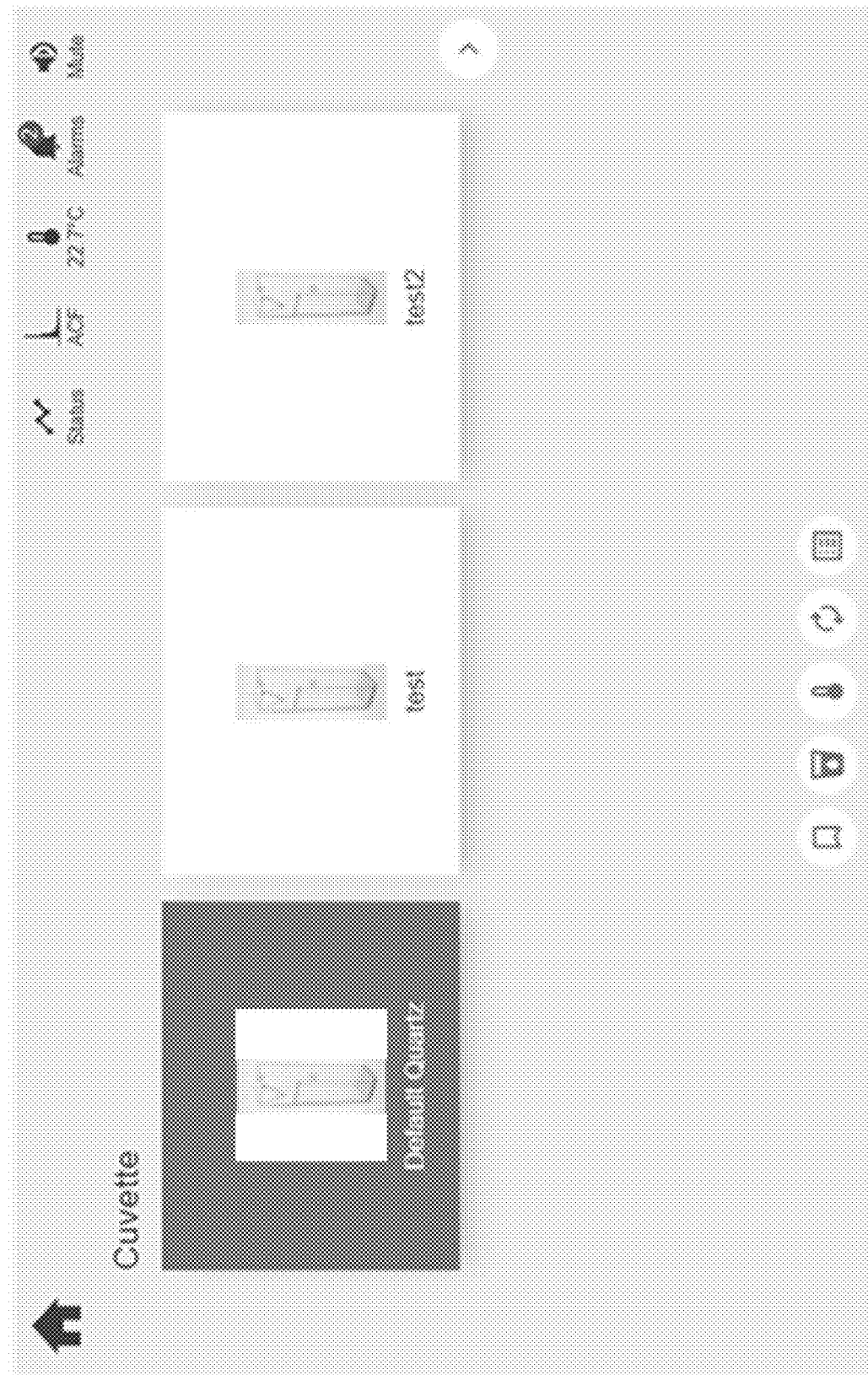
FIG. 3A depicts a graphical display in accordance with an embodiment.
Figure 3B:
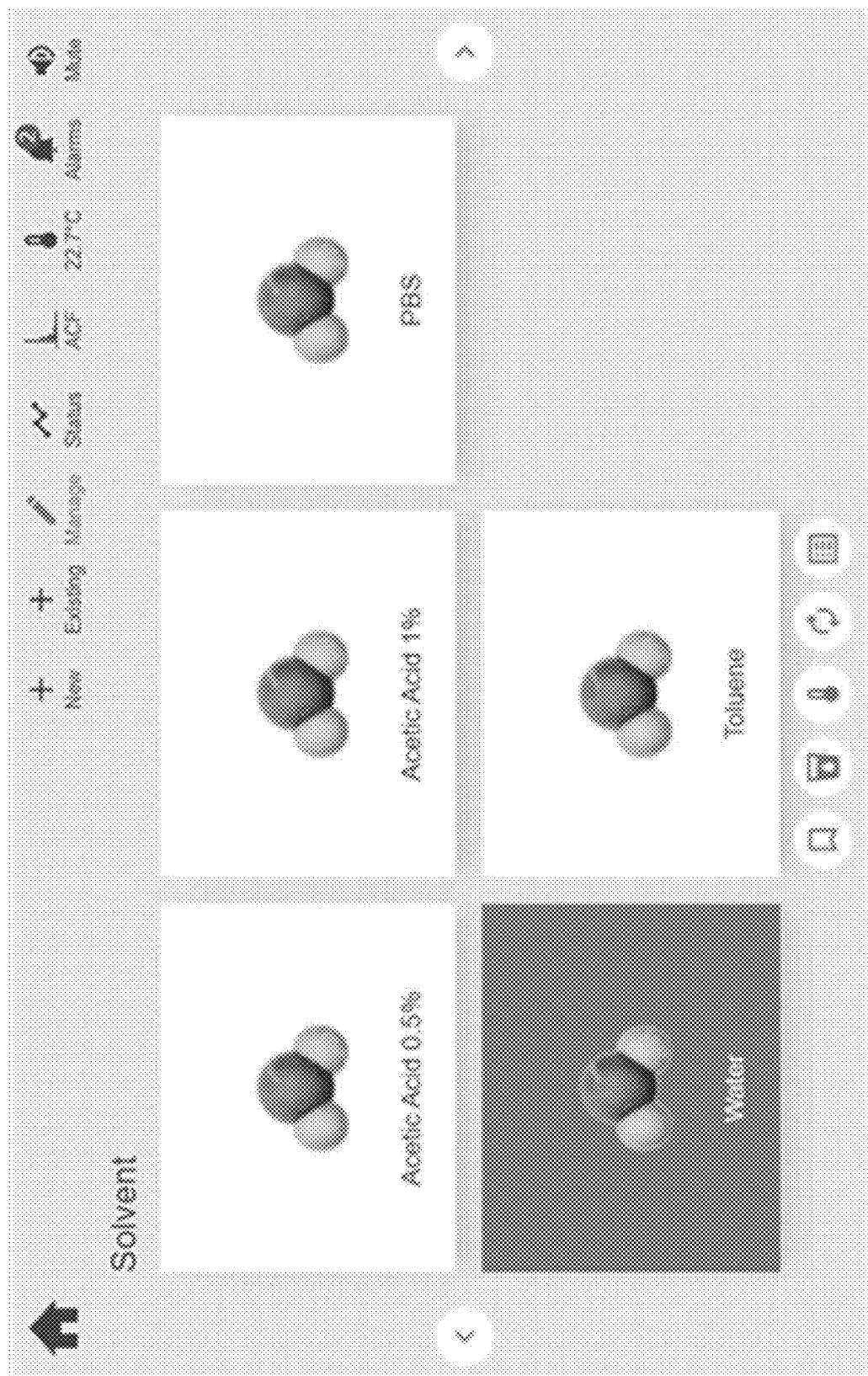
FIG. 3B depicts a graphical display in accordance with an embodiment.
Figure 3C:
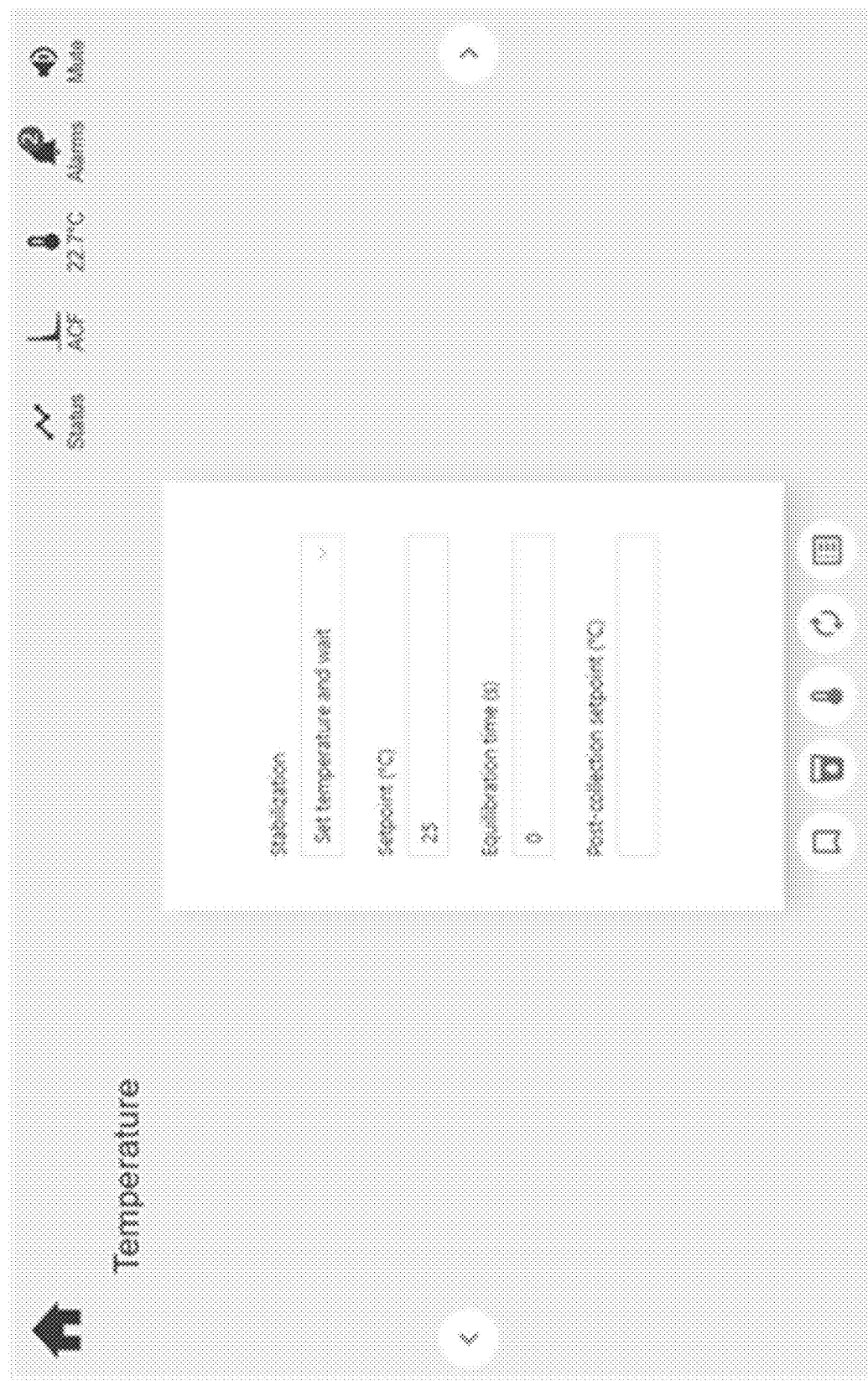
FIG. 3C depicts a graphical display in accordance with an embodiment.
Figure 3D:
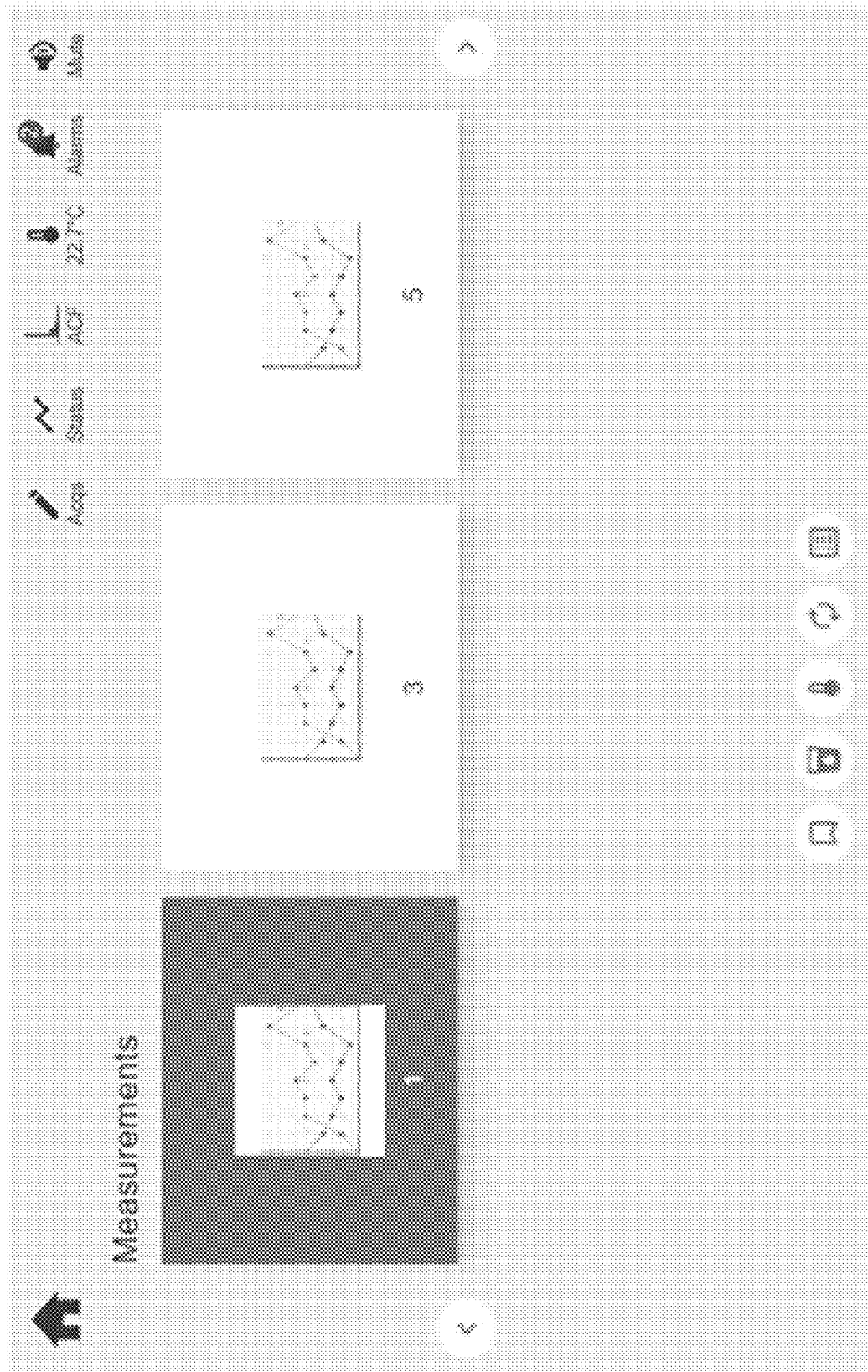
FIG. 3D depicts a graphical display in accordance with an embodiment.
Figure 3E:
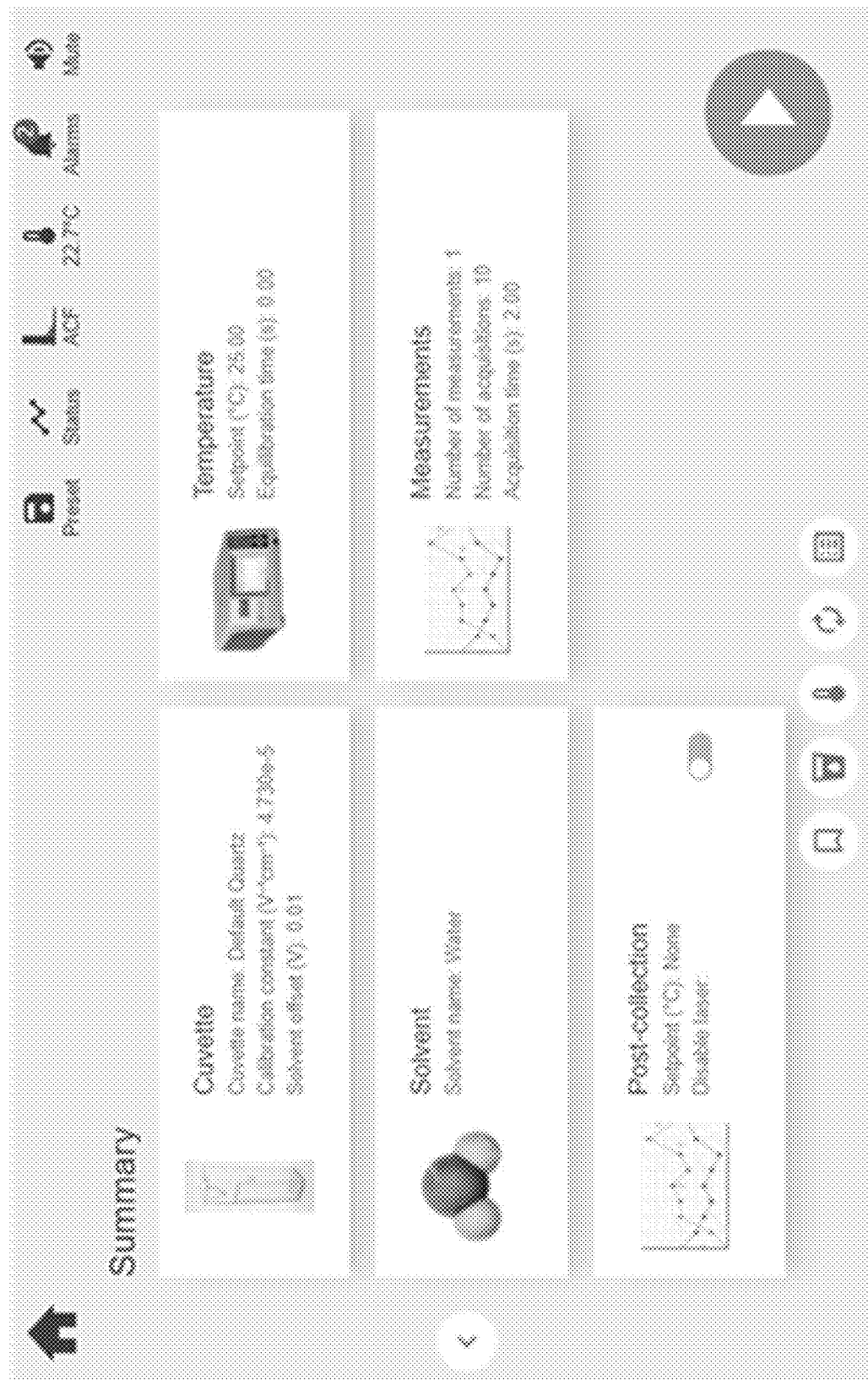
FIG. 3E depicts a graphical display in accordance with an embodiment.
Figure 4A:
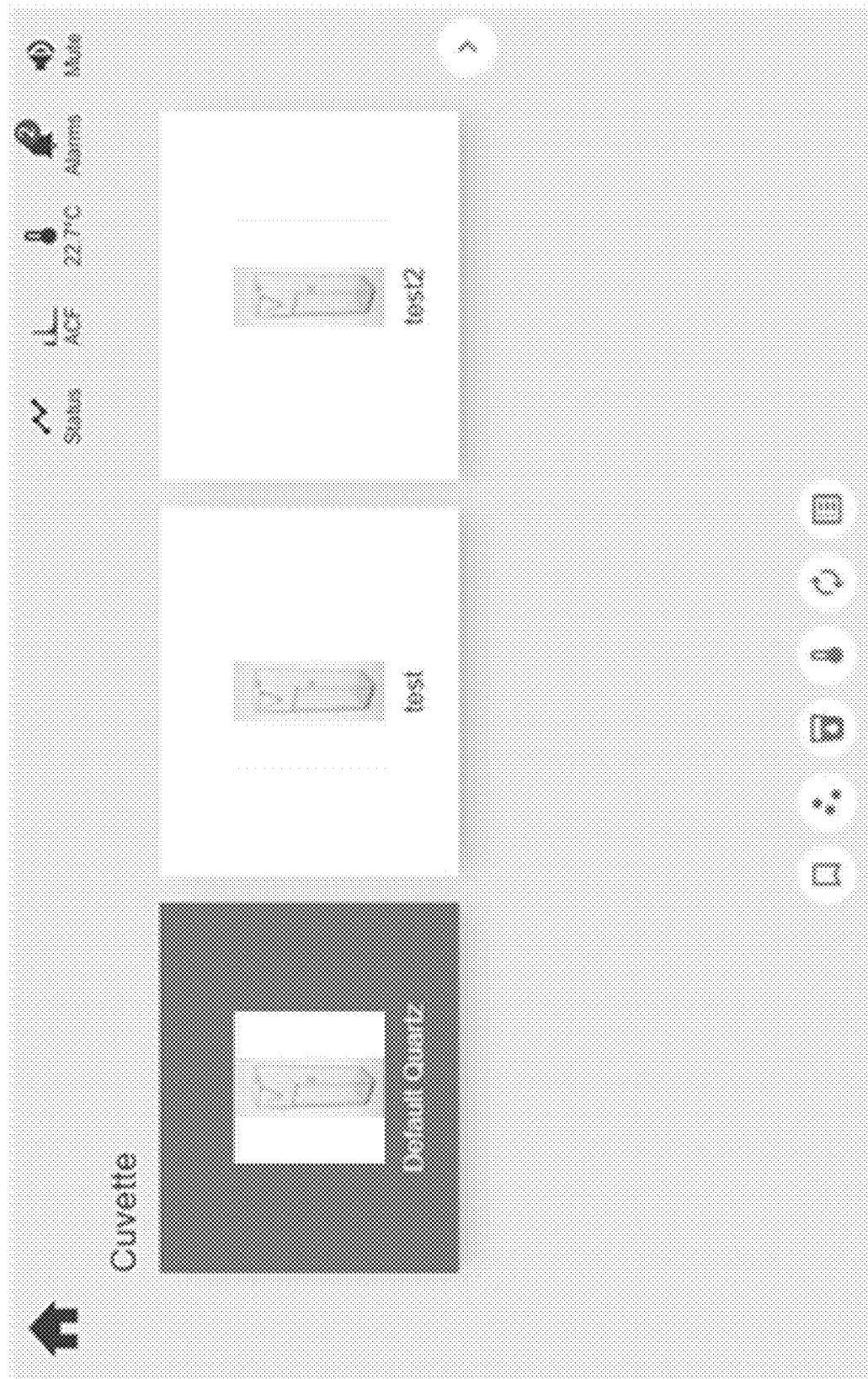
FIG. 4A depicts a graphical display in accordance with an embodiment.
Figure 4B:
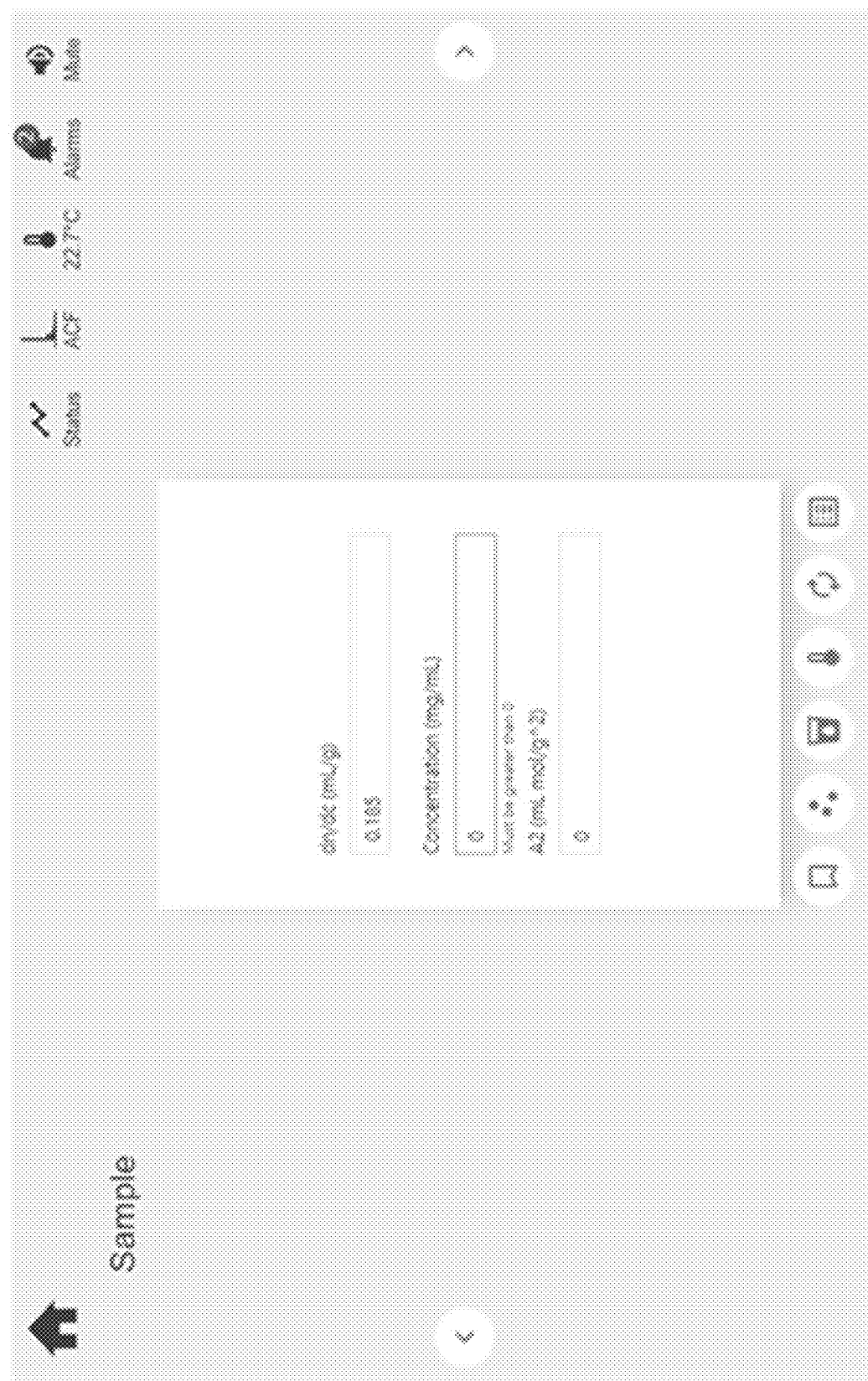
FIG. 4B depicts a graphical display in accordance with an embodiment.
Figure 4C:
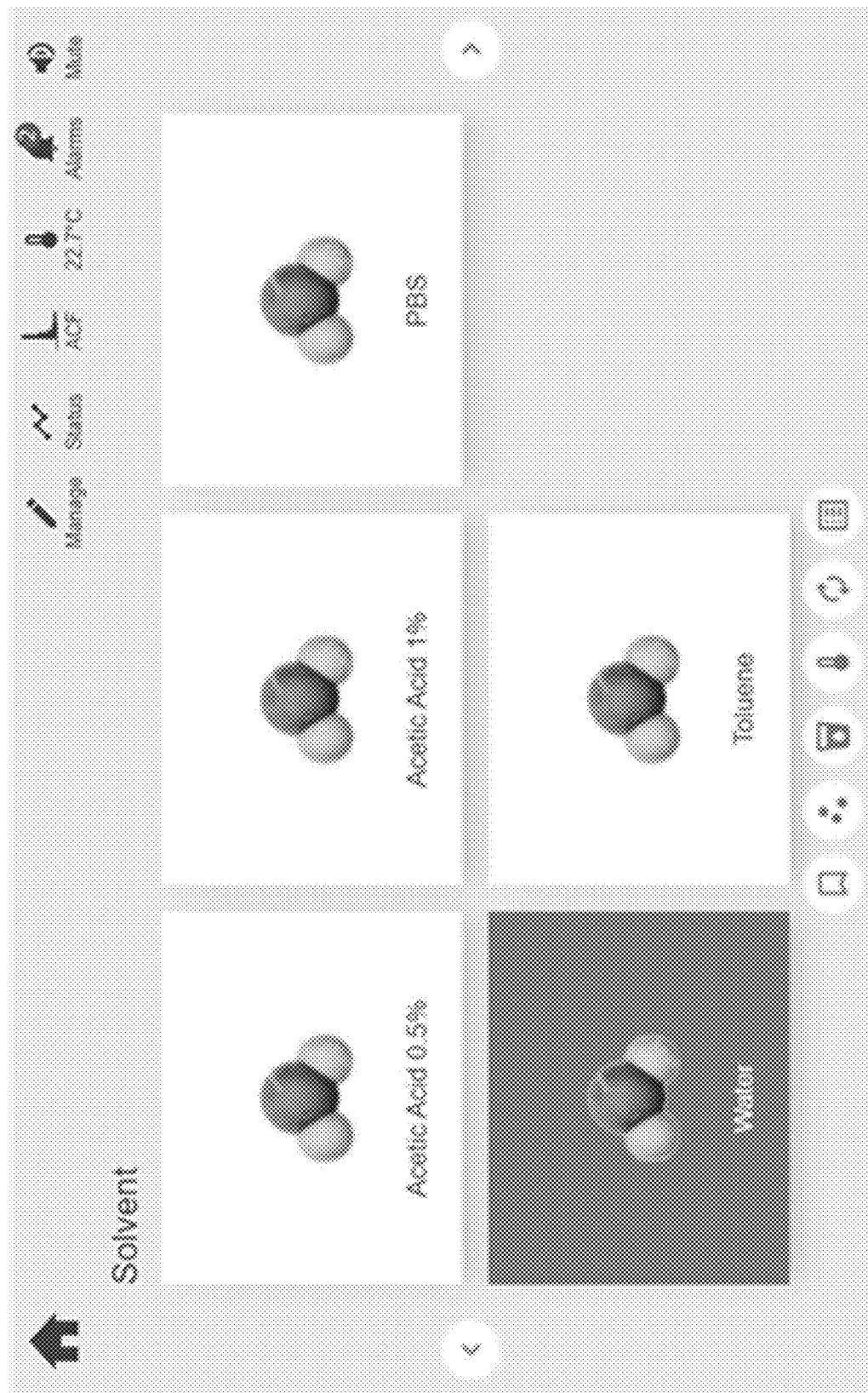
FIG. 4C depicts a graphical display in accordance with an embodiment.
Figure 4D:
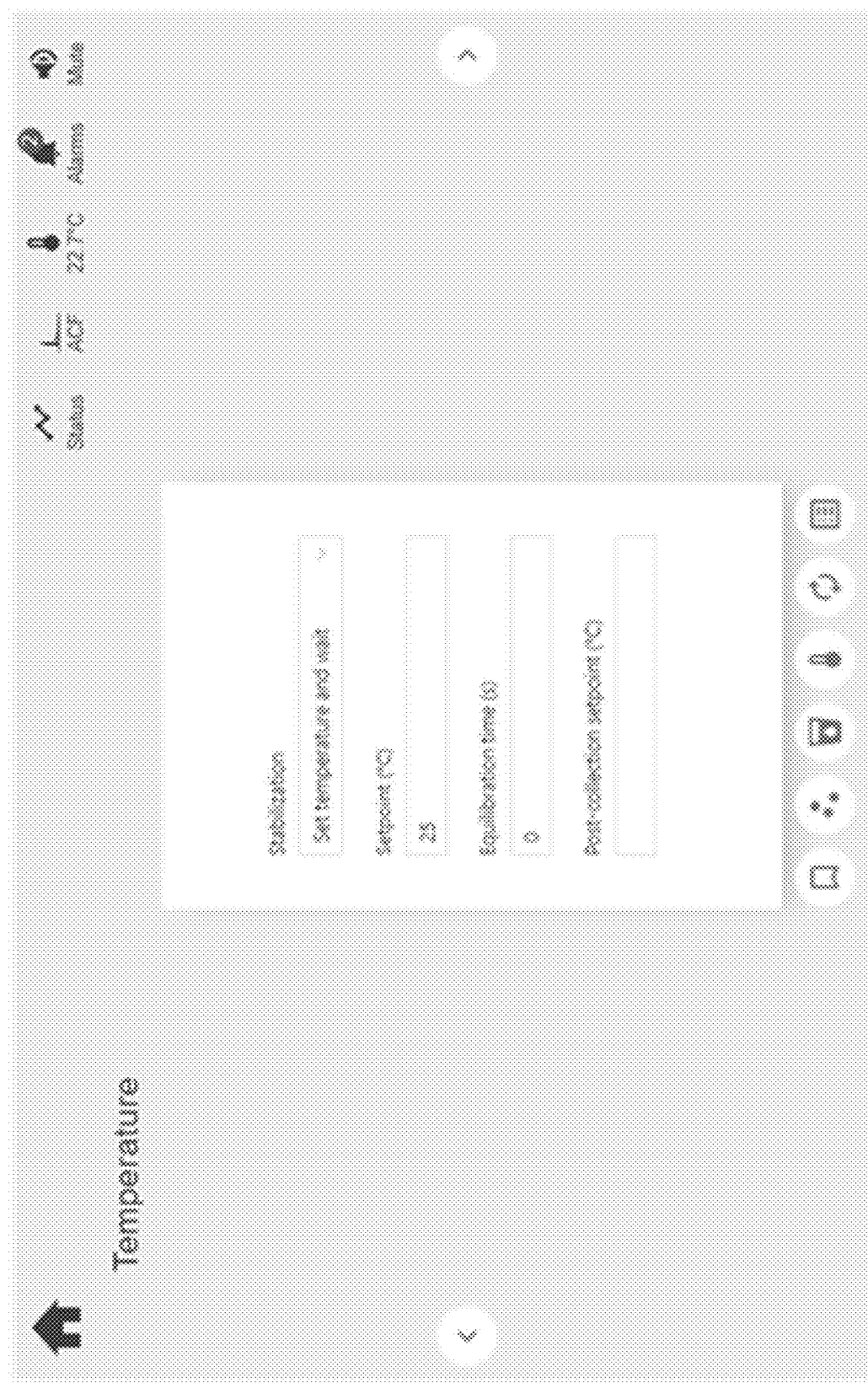
FIG. 4D depicts a graphical display in accordance with an embodiment.
Figure 4E:
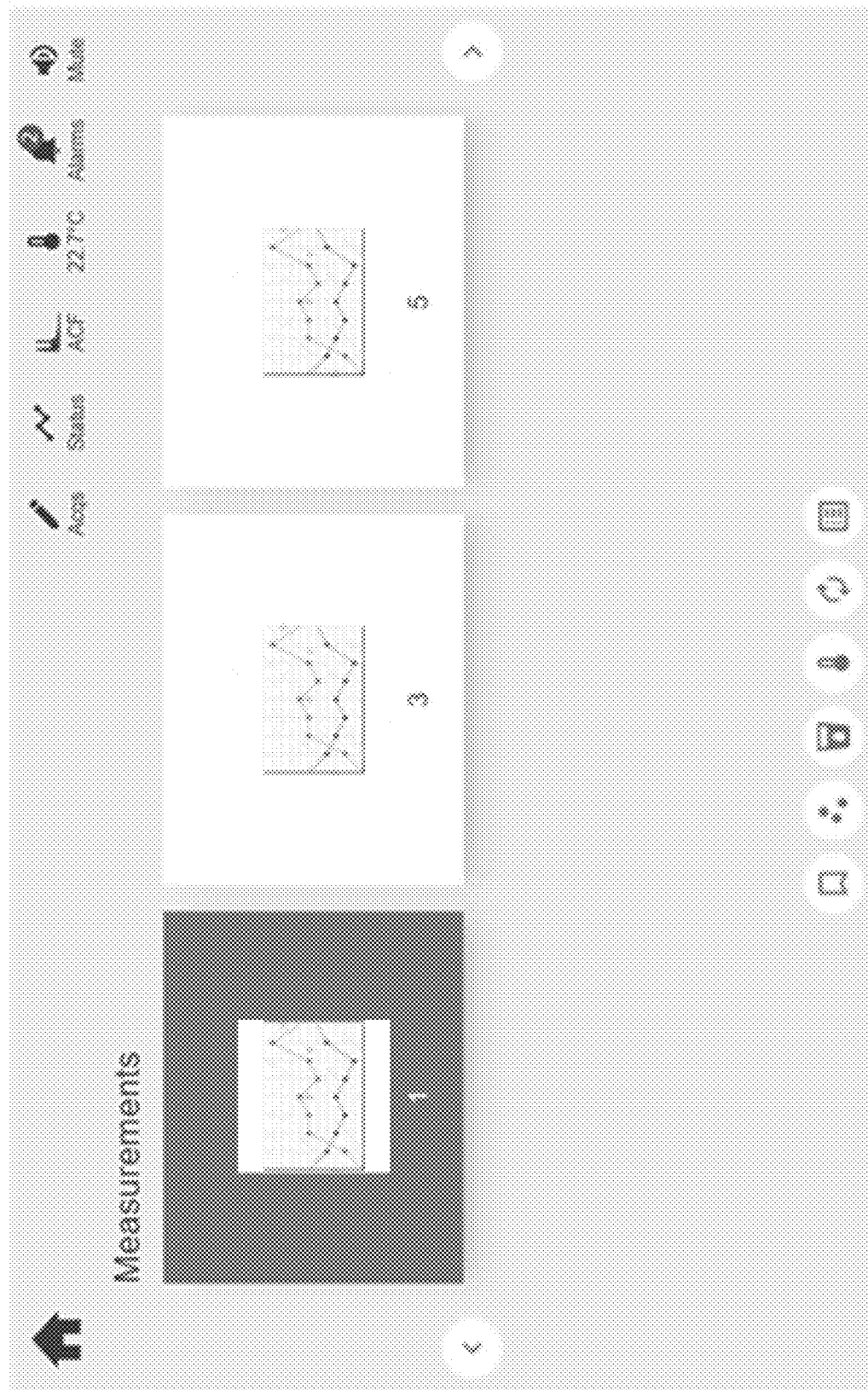
FIG. 4E depicts a graphical display in accordance with an embodiment.
Figure 4F:
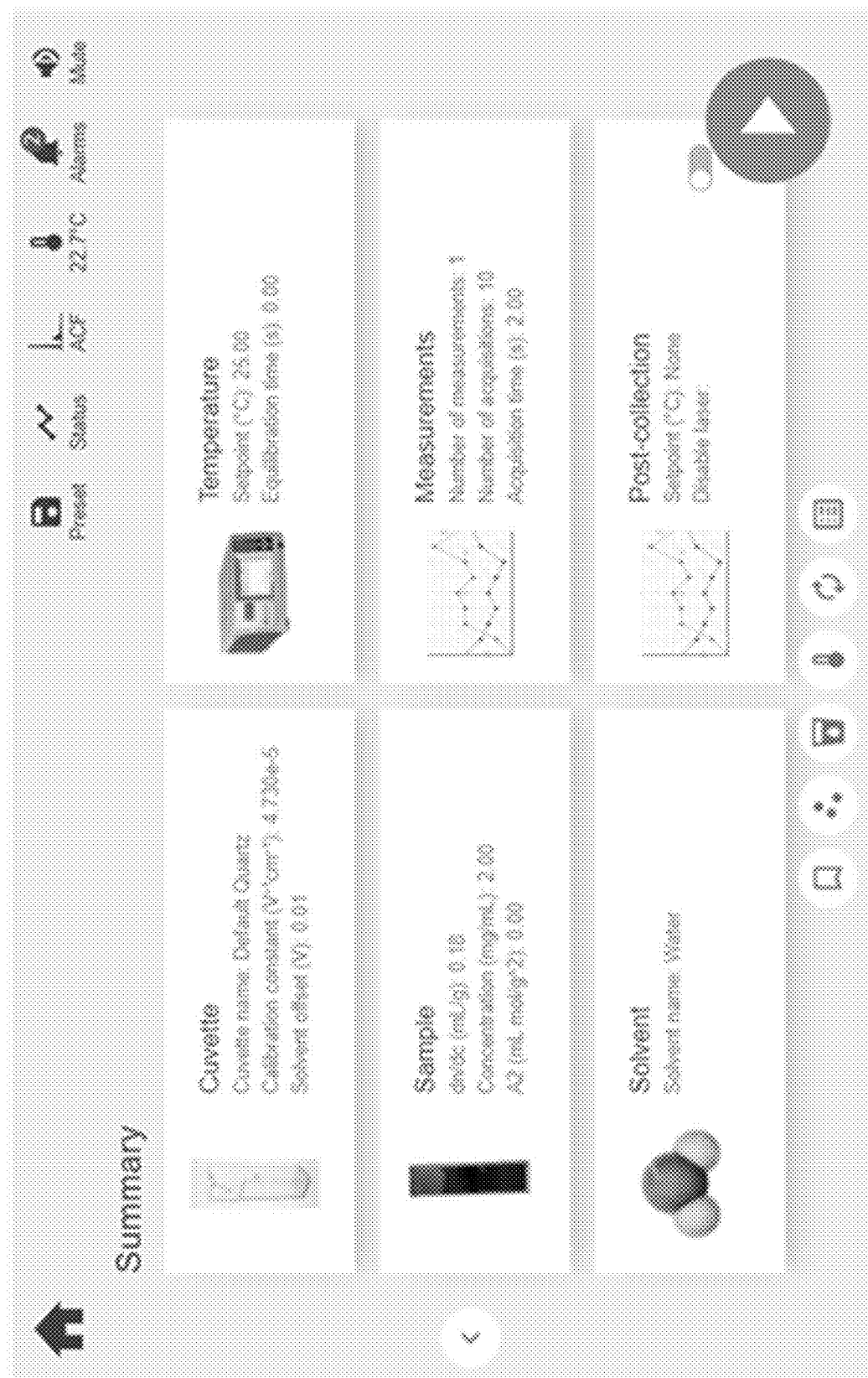
FIG. 4F depicts a graphical display in accordance with an embodiment.

In an embodiment, the displaying the alarms page includes displaying, by the computer system, on the display, at least one of at least one active instrument alarm and at least one historical alarm, corresponding to the measurement. In an embodiment, the alarm page is depicted in FIG. 2. In an embodiment, the alarm corresponds to one of the instrument, the measurement, an experiment corresponding to the measurement, and a collection corresponding to the measurement. In an embodiment, operation 112 includes displaying, by the computer system, on the display, at least one of at least one active instrument alarm and at least one historical alarm, corresponding to the measurement.

Pages

Figure 5:
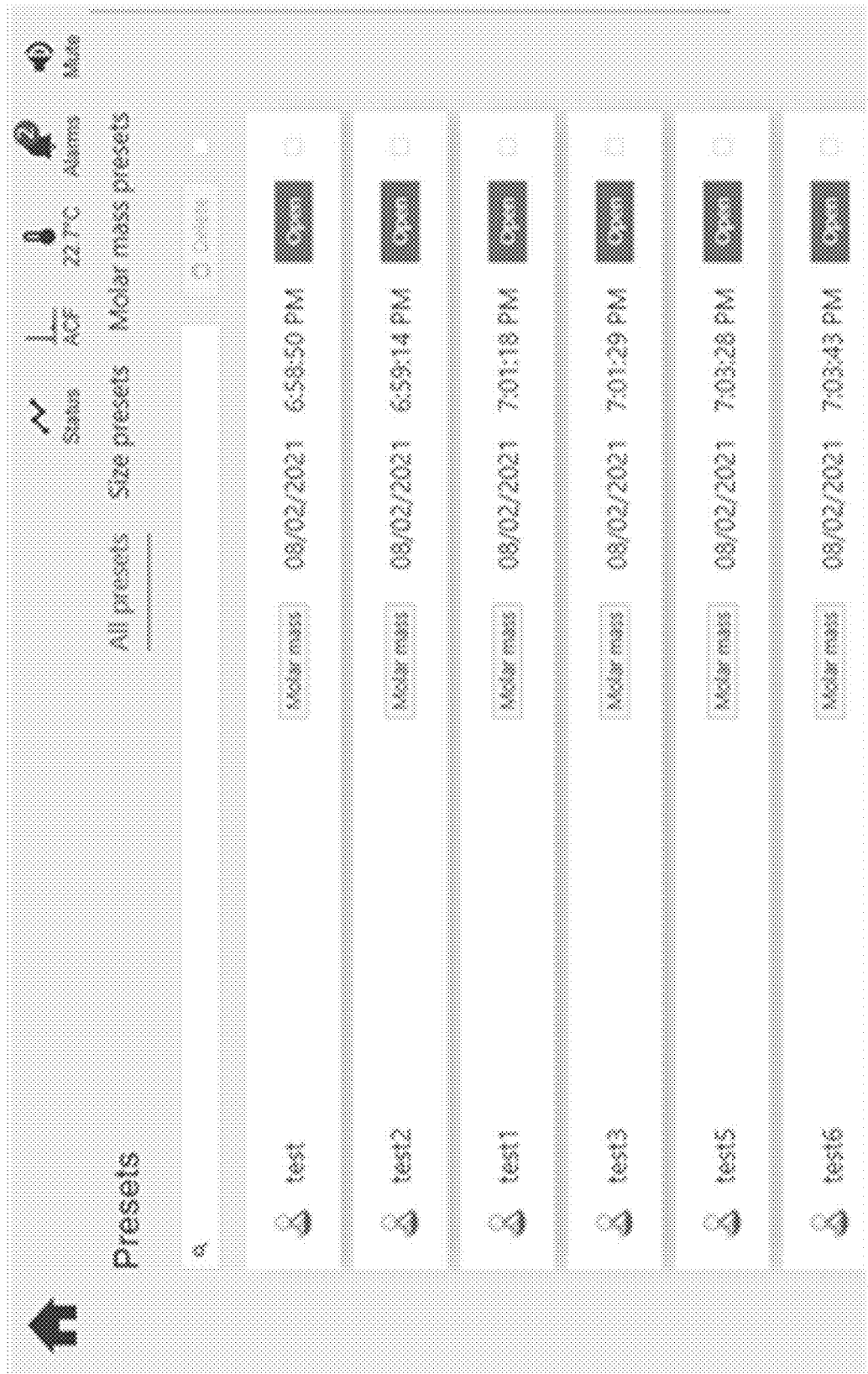
FIG. 5 depicts a graphical display in accordance with an embodiment.
Figure 7:
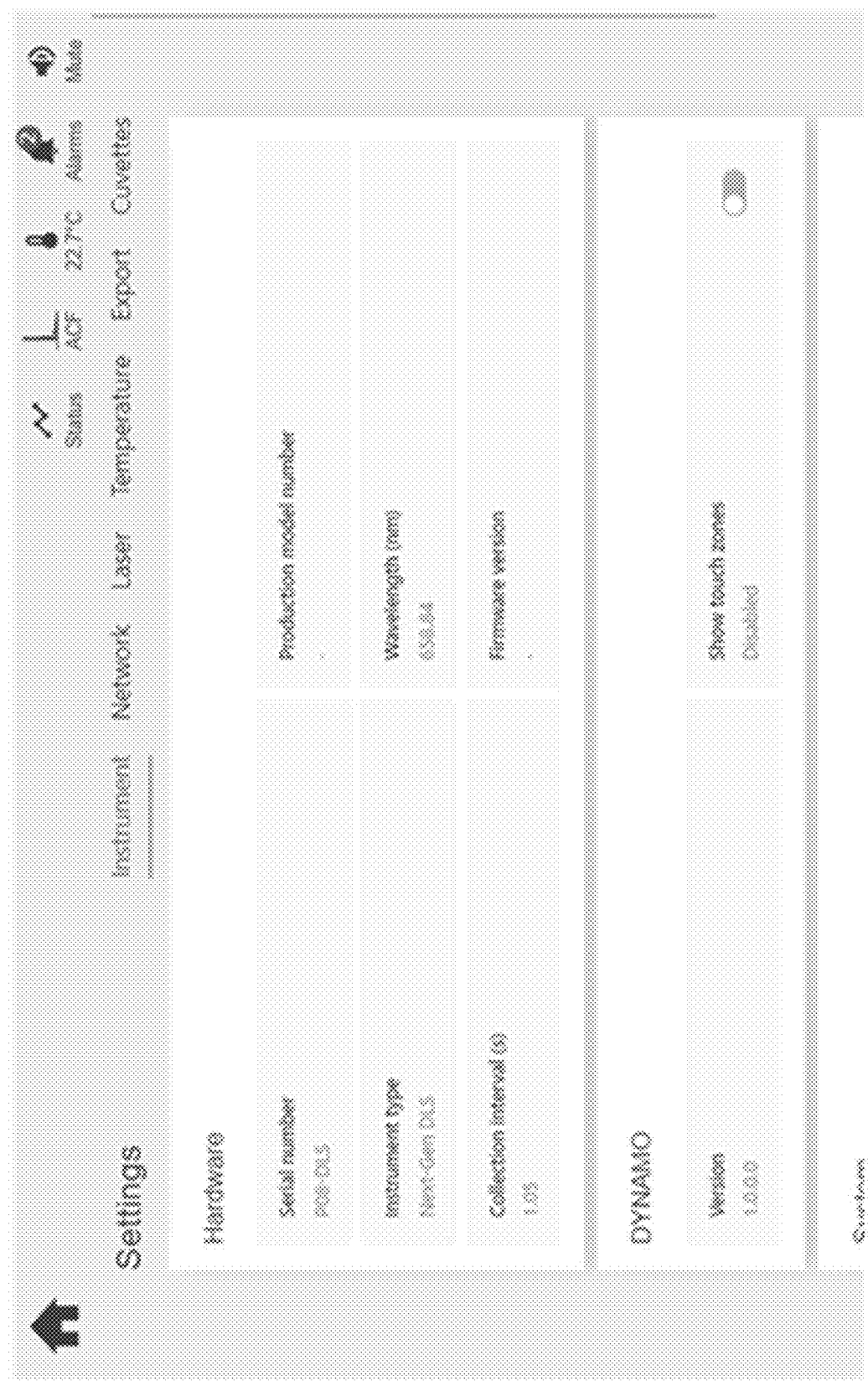
FIG. 7 depicts a graphical display in accordance with an embodiment.
Figure 8:
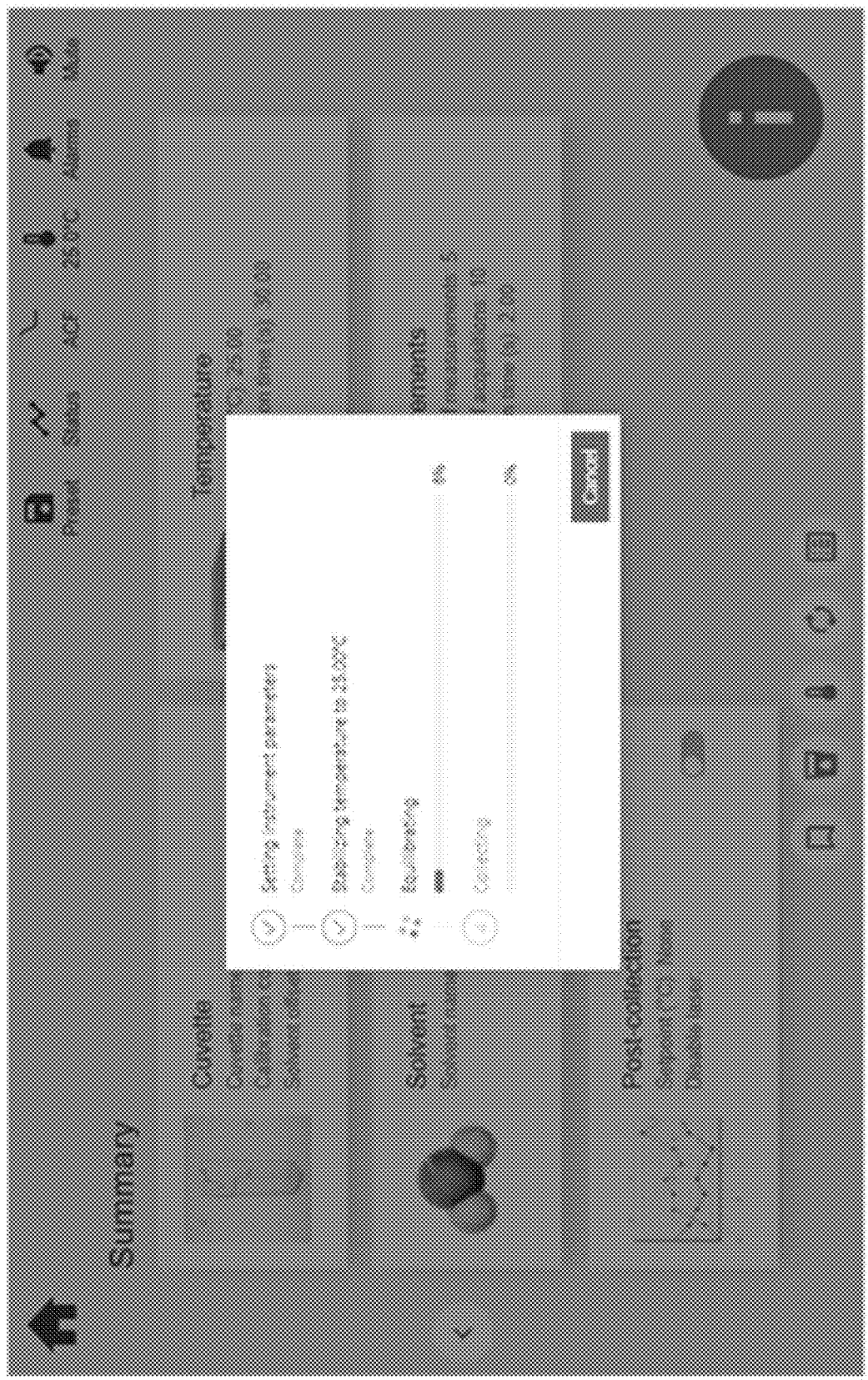
FIG. 8 depicts a graphical display in accordance with an embodiment.
Figure 9A:
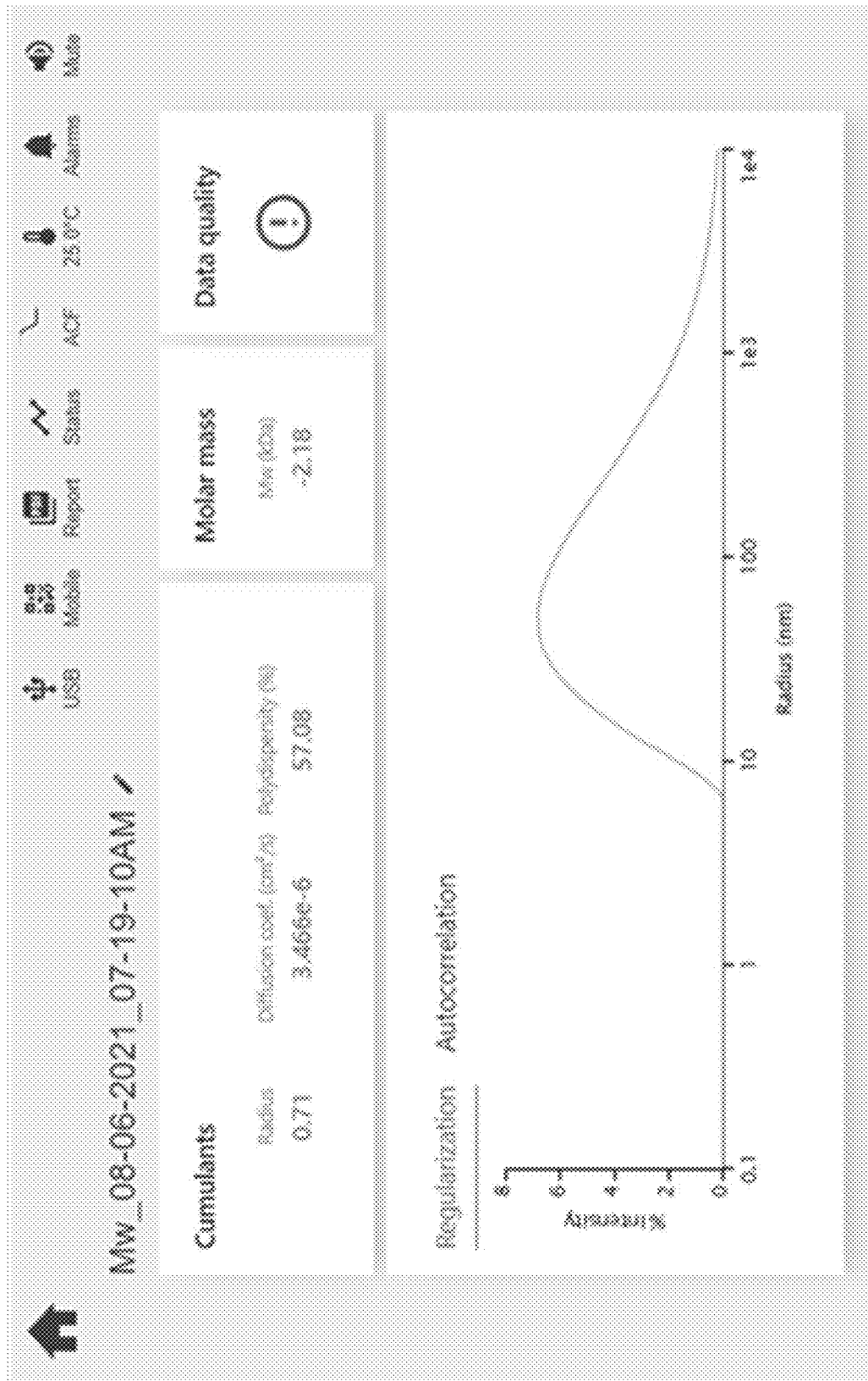
FIG. 9A depicts a graphical display in accordance with an embodiment.
Figure 9B:
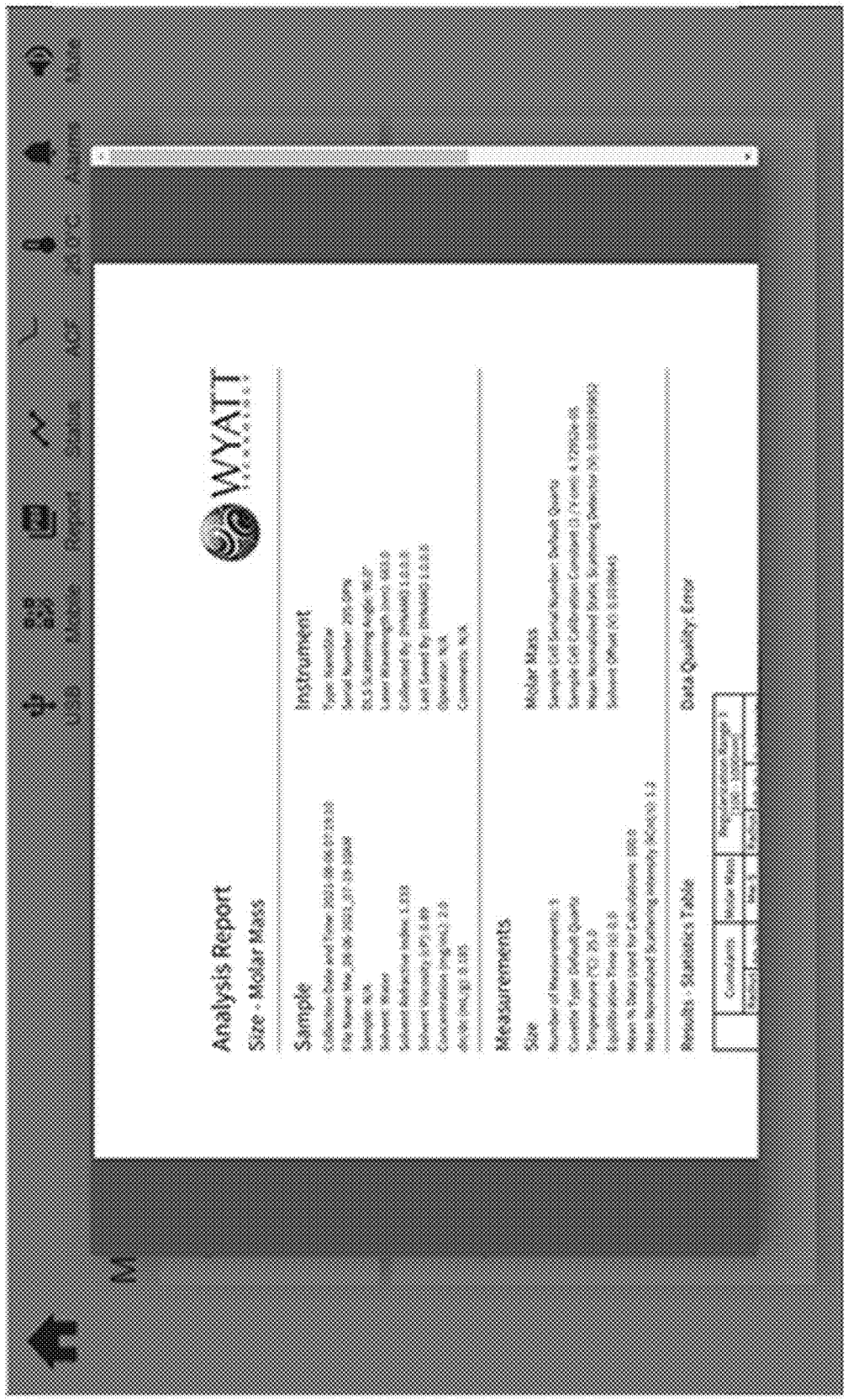
FIG. 9B depicts a graphical display in accordance with an embodiment.

In an embodiment, the guided size workflow includes pages depicted in FIG. 3A, FIG. 3B, FIG. 3C, FIG. 3D, and FIG. 3E. In an embodiment, the guided molar mass workflow includes pages depicted in FIG. 4A, FIG. 4B, FIG. 4C, FIG. 4D, FIG. 4E, and FIG. 4F. In an embodiment, FIG. 5 depicts the presets page. In an embodiment, FIG. 6 depicts the experiments page. In an embodiment, FIG. 7 depicts the settings page. In an embodiment, FIG. 8 depicts the progress page. In an embodiment, FIG. 9A depicts the results page. In an embodiment, FIG. 9B depicts the report from the results page.

Progress

In a further embodiment, the method, system, and computer program product further include (a) displaying, by the computer system, on the display a progress graphic, and (b) in response to receiving, by the computer system, a selection command corresponding to the progress graphic, transmitting, by the computer system, a collect command to the instrument to collect data traces, instrument settings, experiment parameters, and instrument usage data for the measurement, resulting in a collection corresponding to the measurement, and to store the data traces, the instrument settings, the experiment parameters, and instrument usage data in a data store. In an embodiment, the progress graphic includes a green arrow graphic. In an embodiment, the data store includes at least one of the instrument, cloud storage, a storage device, a personal computer, and a mobile device.

In an embodiment, the instrument usage data include at least one user id corresponding to a user of the instrument. For example, multiple user ids could allow for concurrent users of the method, system, and computer program product.

In a further embodiment, the method, system, and computer program product further include displaying, by the computer system, on the display, a progress page configured to display an amount of time remaining until the collection is complete. In a further embodiment, the method, system, and computer program product further include transmitting, by the computer system, at least one status of the collection to a data sink. In an embodiment, the collection includes an experiment running on the instrument. In an embodiment, the data sink includes at least one of a user, a computer database, a computer storage device, cloud storage, a computer system (e.g., artificial intelligence), where the transmitting includes at least one of transmitting at least one email message, transmitting text, and transmitting sensory data, corresponding to visual, auditory, tactile, taste, and olfactory output.

Results

In a further embodiment, the transmitting the at least one status of the collection to the data sink further includes displaying, by the computer system, a results page allowing for at least one of displaying at least one of data and graphs of data of the collection and displaying at least one report of at least one of data and graphs of data of the collection.

Multiple Users

In a further embodiment, the method, system, and computer program product further include executing, by the computer system, a set of logical operations identifying each individual computer system among the plurality of client computer systems, by at least a session ID corresponding to the individual computer system and an IP address corresponding to the individual computer system. For example, while a client control ID could control the instrument, the session ID could allow a user to continue the user's work at another time. In an embodiment, the identifying uses the session ID and the IP address as a key pair. For example, with a session ID (e.g., from a computer system), the user could start multiple sessions of the method on the same computer system using the same IP address.

Summary Function

In an embodiment, the summary function is configured to display, by the computer system on the display, at least one of a measurements graphic, a cuvette graphic, a temperature graphic, a solvent graphic, and a post collection graphic. In a further embodiment, the method, system, and computer program product further include displaying, by the computer system, on the display a start graphic and a cancel graphic configured to display, by the computer system on the display, at least one of a number of measurements graphic, a cuvette graphic, a temperature graphic, a sample type graphic, and a solvent graphic. In an embodiment, operation 114 further includes displaying, by the computer system, on the display the start graphic and the cancel graphic configured to display, by the computer system on the display, the at least one of a number of measurements graphic, a cuvette graphic, a temperature graphic, a sample type graphic, and a solvent graphic. In a further embodiment, the method, system, and computer program product further include in response to receiving, by the computer system, a selection command corresponding to the sample type graphic, executing, by the computer system, a set of logical operations allowing for selecting at least one of a workflow, measurement settings, and data filter settings, for the measurement. In an embodiment, operation 114 further includes in response to receiving, by the computer system, a selection command corresponding to the sample type graphic, executing, by the computer system, a set of logical operations allowing for selecting at least one of a workflow, measurement settings, and data filter settings, for the measurement.

In an embodiment, the summary function is configured to display, by the computer system on the display, at least one of a measurements graphic, a cuvette graphic, a temperature graphic, a sample type graphic, a solvent graphic, and a post-collection graphic. In a further embodiment, the method, system, and computer program product further include displaying, by the computer system, on the display a start graphic and a cancel graphic. In an embodiment, operation 116 further includes displaying, by the computer system, on the display the start graphic and the cancel graphic. In an embodiment, the displaying on the display a start graphic and a cancel graphic include in response to receiving, by the computer system, a selection command corresponding to the sample type graphic, executing, by the computer system, a set of logical operations allowing for selecting at least one of a workflow, measurement settings, and data filter settings, for the measurement. In an embodiment, operation 116 includes displaying on the display a start graphic and a cancel graphic include in response to receiving, by the computer system, a selection command corresponding to the sample type graphic, executing, by the computer system, a set of logical operations allowing for selecting at least one of a workflow, measurement settings, and data filter settings, for the measurement.

Data Quality

In a further embodiment, the method, system, and computer program product further include (a) displaying, by the computer system, on the display a data quality graphic, and (b) in response to receiving, by the computer system, a selection command corresponding to the data quality graphic, displaying, by the computer system on the display, an assessment of results corresponding to the measurement.

In an embodiment, the data quality graphic is displayed via the results page. In an embodiment, the assessment is realized via a table, heuristics, artificial intelligence (AI), and machine learning. In an embodiment, the assessment pertains to one of the analysis, the validity, and the instrument status, corresponding to the measurement.

Guided Workflow

In an embodiment, the guided workflow includes a workflow guided by a rule set corresponding to an interdependency among parameters of the measurement. In an embodiment, the rule set includes at least one of auto detect sample, auto detect cuvette, temperature for cuvette, molar mass for cuvette. In an embodiment, the rule set includes at least one of a table, AI, machine learning, and heuristics. For example, the rule set could reflect a cuvette dependency where a molar mass workflow could require using a quartz cuvette. Other dependencies could include temperature dependency, sample dependency, solvent dependency.

Zeta Potential

In a further embodiment, the displaying further includes displaying, by the computer system, at least one of a zeta potential graphic, a molar mass and size graphic, and a zeta potential and size graphic.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 524, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
displaying, by a computer system, at least one graphic,
wherein the at least one graphic is one of an alarms graphic, a size graphic, a molar mass graphic, a presets graphic, an experiments graphic, and a settings graphic, on a display logically coupled to a light scattering measurement instrument, thereby resulting in a graphics page,
wherein the instrument is configured to measure at least one of dynamic light scattering, static light scattering, and electrophoretic light scattering, of at least one sample, resulting in a light scattering measurement;
in response to receiving, by the computer system, a selection command corresponding to the alarms graphic, displaying, by the computer system, on the display an alarms page;
in response to receiving, by the computer system, a selection command corresponding to the size graphic, displaying, by the computer system, on the display a size workflow page displaying a guided size workflow,
wherein the guided size workflow comprises size functions corresponding to size parameter commands to direct the instrument to take at least one size measurement in light of entered size parameter commands corresponding to the size functions;
in response to receiving, by the computer system, a selection command corresponding to the molar mass graphic, displaying, by the computer system, on the display a molar mass workflow page displaying a guided molar mass workflow,
wherein the guided molar mass workflow comprises molar mass functions to direct the instrument to take at least one molar mass measurement in light of entered molar mass parameter commands corresponding to the molar mass parameter commands;
in response to receiving, by the computer system, a selection command corresponding to the presets graphic, displaying, by the computer system, on the display a presets page configured to provide access to at least one saved workflow;
in response to receiving, by the computer system, a selection command corresponding to the experiments graphic, displaying, by the computer system, on the display an experiments page configured to display results obtained during at least one saved experiment and configured to provide access to the results; and
in response to receiving, by the computer system, a selection command corresponding to the settings graphic, displaying, by the computer system, on the display a settings page configured to display instrument settings and configured to allow for modifying at least one setting of the instrument.

2. The method of claim 1 wherein the displaying the alarms page comprises
displaying, by the computer system, on the display, at least one of at least one active instrument alarm and at least one historical alarm, corresponding to the measurement.

3. The method of claim 1 wherein the size functions comprise
a cuvette function, a solvent function, a temperature function, a measurements function, and a summary function.

4. The method of claim 1 wherein the size parameter commands comprise a cuvette command, a solvent command, a temperature command, and a measurements command.

5. The method of claim 1 wherein the molar mass functions comprise
a cuvette function, a sample function, a solvent function, a temperature function, a measurements function, and a summary function.

6. The method of claim 1 wherein the molar mass parameter commands comprise a cuvette command, sample command, a solvent command, a temperature command, and a measurements command.

7. The method of claim 1 wherein the results obtained during the at least one saved experiment comprise a workflow and data corresponding to the at least one saved experiment.

8. The method of claim 1 further comprising:
displaying, by the computer system, on the display a progress graphic; and
in response to receiving, by the computer system, a selection command corresponding to the progress graphic, transmitting, by the computer system, a collect command to the instrument to collect data traces, instrument settings, experiment parameters, and instrument usage data for the measurement, resulting in a collection corresponding to the measurement, and to store the data traces, the instrument settings, the experiment parameters, and instrument usage data in a data store.

9. The method of claim 8 wherein the instrument usage data comprise at least one user id corresponding to a user of the instrument.

10. The method of claim 8 further comprising
displaying, by the computer system, on the display, a progress page configured to display an amount of time remaining until the collection is complete.

11. The method of claim 8 further comprising
transmitting, by the computer system, at least one status of the collection to a data sink.

12. The method of claim 10 further comprising
displaying, by the computer system, a results page allowing for at least one of displaying at least one of data and graphs of data of the collection and displaying at least one report of at least one of data and graphs of data of the collection.

13. The method of claim 1 further comprising
executing, by the computer system, a set of logical operations identifying each individual computer system among the plurality of client computer systems, by at least a session ID corresponding to the individual computer system and an IP address corresponding to the individual computer system.

14. The method of claim 3 wherein the summary function is configured to display, by the computer system on the display, at least one of a measurements graphic, a cuvette graphic, a temperature graphic, a solvent graphic, and a post collection graphic.

15. The method of claim 14 further comprising
displaying, by the computer system, on the display a start graphic and a cancel graphic.

16. The method of claim 5 wherein the summary function is configured to display, by the computer system on the display, at least one of a measurements graphic, a cuvette graphic, a temperature graphic, a sample type graphic, a solvent graphic, and a post-collection graphic.

17. The method of claim 16 further comprising displaying, by the computer system, on the display a start graphic and a cancel graphic.

18. The method of claim 17 wherein in response to receiving, by the computer system, a selection command corresponding to the sample type graphic, executing, by the computer system, a set of logical operations allowing for selecting at least one of a workflow, measurement settings, and data filter settings, for the measurement.

19. The method of claim 1 further comprising displaying, by the computer system, on the display a data quality graphic; and in response to receiving, by the computer system, a selection command corresponding to the data quality graphic, displaying, by the computer system on the display, an assessment of results corresponding to the measurement.

20. The method of claim 1 wherein the guided workflow comprises a workflow guided by a rule set corresponding to an interdependency among parameters of the measurement.

21. The method of claim 1 wherein the displaying further comprises displaying, by the computer system, at least one of a zeta potential graphic, a molar mass and size graphic, and a zeta potential and size graphic.

\* \* \* \* \*